US008005802B2

(12) United States Patent
Lu et al.

(10) Patent No.: US 8,005,802 B2
(45) Date of Patent: Aug. 23, 2011

(54) PARTIAL EVALUATION OF RULE SETS

(75) Inventors: Edwina Lu, Palo Alto, CA (US); Lik Wong, Union City, CA (US); Sanjay Kaluskar, Mountain View, CA (US); James Stamos, Saratoga, CA (US); Neerja Bhatt, Mountain View, CA (US); Wei Wang, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 10/452,850

(22) Filed: May 30, 2003

(65) Prior Publication Data
US 2004/0030707 A1 Feb. 12, 2004

Related U.S. Application Data

(63) Continuation-in-part of application No. 10/308,924, filed on Dec. 2, 2002, now Pat. No. 6,889,231, and a continuation-in-part of application No. 10/418,882, filed on Apr. 17, 2003.

(60) Provisional application No. 60/400,532, filed on Aug. 1, 2002, provisional application No. 60/410,883, filed on Sep. 13, 2002.

(51) Int. Cl.
*G06F 17/30* (2006.01)

(52) U.S. Cl. .......... 707/694; 707/999.009; 707/999.101; 707/999.102

(58) Field of Classification Search ............ 707/1, 100, 707/101, 10, 200, 999.009, 999.101–999.102, 707/694
See application file for complete search history.

(56) References Cited

U.S. PATENT DOCUMENTS

| 5,283,856 | A | * | 2/1994 | Gross et al. ............... 706/47 |
| 5,446,885 | A | | 8/1995 | Moore et al. |
| 5,564,047 | A | | 10/1996 | Bloem et al. |
| 5,627,764 | A | | 5/1997 | Schutzman et al. |

(Continued)

FOREIGN PATENT DOCUMENTS

EP 0 743 596 A2 11/1996

(Continued)

OTHER PUBLICATIONS

PCT Written Opinion from corresponding PCT/US03/14892.

(Continued)

*Primary Examiner* — Apu M Mofiz
*Assistant Examiner* — Monica M Pyo
(74) *Attorney, Agent, or Firm* — Hickman Palermo Truong & Becker LLP

(57) ABSTRACT

Described herein are various approaches that allow rules to be used to specify actions, that alleviate the complexity and burden of developing and maintaining rules in a rules-based messaging system, and that provide more efficient ways of evaluating rules. The approaches allow rules to specify user-defined transformation functions for transforming messages, to specify when and how to perform row migration, and to specify other types of actions. Rules are grouped into rule sets. Several types of rule sets, referred to as positive and negative rule sets, allow users to use rules that are less complex to develop and maintain. Rule sets are evaluated more efficiently by attempting to evaluate the rule set with less information than is needed to evaluate all the rules in the rule set. Also, the results of rules evaluations that are based on a set of values are cached for later retrieval.

14 Claims, 10 Drawing Sheets

U.S. PATENT DOCUMENTS

| | | | |
|---|---|---|---|
| 5,640,561 A | 6/1997 | Satoh et al. | |
| 5,680,602 A | 10/1997 | Bloem et al. | |
| 5,802,253 A | 9/1998 | Gross et al. | |
| 5,852,818 A * | 12/1998 | Guay et al. | 707/1 |
| 5,870,747 A | 2/1999 | Sundaresan | |
| 5,940,839 A | 8/1999 | Chen et al. | |
| 5,984,786 A | 11/1999 | Ehrman | |
| 5,995,980 A | 11/1999 | Olson et al. | |
| 5,999,931 A | 12/1999 | Breitbart et al. | |
| 6,023,571 A | 2/2000 | Matsumoto et al. | |
| 6,067,540 A | 5/2000 | Hyde | |
| 6,073,129 A * | 6/2000 | Levine et al. | 707/4 |
| 6,169,988 B1 | 1/2001 | Asakura | |
| 6,182,086 B1 | 1/2001 | Lomet et al. | |
| 6,185,555 B1 | 2/2001 | Sprenger et al. | |
| 6,192,378 B1 | 2/2001 | Abrams et al. | |
| 6,233,537 B1 | 5/2001 | Gryphon et al. | |
| 6,247,017 B1 | 6/2001 | Martin | |
| 6,304,882 B1 | 10/2001 | Strellis et al. | |
| 6,427,146 B1 | 7/2002 | Chu | |
| 6,442,568 B1 | 8/2002 | Velasco et al. | |
| 6,466,950 B1 | 10/2002 | Ono | |
| 6,490,574 B1 * | 12/2002 | Bennett et al. | 706/47 |
| 6,493,701 B2 | 12/2002 | Ponnekanti | |
| 6,529,954 B1 | 3/2003 | Cookmeyer et al. | |
| 6,539,381 B1 | 3/2003 | Prasad et al. | |
| 6,560,592 B1 | 5/2003 | Reid et al. | |
| 6,604,093 B1 | 8/2003 | Etzion et al. | |
| 6,691,155 B2 | 2/2004 | Gottfried | |
| 6,697,791 B2 | 2/2004 | Hellerstein et al. | |
| 6,728,879 B1 | 4/2004 | Atkinson | |
| 6,738,975 B1 | 5/2004 | Yee et al. | |
| 6,757,710 B2 | 6/2004 | Reed | 709/203 |
| 6,801,915 B1 | 10/2004 | Mack | |
| 6,826,579 B1 | 11/2004 | Leymann et al. | |
| 6,850,893 B2 | 2/2005 | Lipkin et al. | |
| 6,868,413 B1 | 3/2005 | Grindrod et al. | |
| 6,889,231 B1 * | 5/2005 | Souder et al. | 1/1 |
| 6,917,946 B2 | 7/2005 | Corl, Jr. et al. | |
| 6,925,476 B1 | 8/2005 | Multer et al. | |
| 7,003,531 B2 | 2/2006 | Holenstein et al. | |
| 7,058,957 B1 | 6/2006 | Nguyen | |
| 7,089,228 B2 | 8/2006 | Arnold et al. | |
| 7,149,738 B2 | 12/2006 | Kumar et al. | |
| 7,177,866 B2 | 2/2007 | Holenstein et al. | |
| 7,243,256 B2 | 7/2007 | Kaiya et al. | |
| 7,289,988 B2 | 10/2007 | Joseph | |
| 2001/0047270 A1 | 11/2001 | Gusick et al. | |
| 2002/0049845 A1 | 4/2002 | Sreenivasan et al. | |
| 2002/0078015 A1 | 6/2002 | Ponnekanti | |
| 2002/0091685 A1 | 7/2002 | Feldman et al. | |
| 2002/0133507 A1 | 9/2002 | Holenstein et al. | |
| 2002/0138582 A1 | 9/2002 | Chandra et al. | |
| 2003/0046421 A1 | 3/2003 | Horvitz et al. | |
| 2003/0135523 A1 | 7/2003 | Brodersen et al. | |
| 2003/0212657 A1 | 11/2003 | Kaluskar et al. | |
| 2003/0212670 A1 | 11/2003 | Yalamanchi et al. | |
| 2003/0236834 A1 | 12/2003 | Gottfried | |
| 2004/0002988 A1 | 1/2004 | Seshadri et al. | |
| 2004/0117407 A1 | 6/2004 | Kumar et al. | |
| 2004/0133591 A1 | 7/2004 | Holenstein et al. | |
| 2004/0162859 A1 | 8/2004 | Guo et al. | |
| 2005/0010545 A1 | 1/2005 | Joseph | |
| 2005/0021567 A1 | 1/2005 | Holenstein et al. | |
| 2005/0125371 A1 | 6/2005 | Bhide et al. | |
| 2005/0193024 A1 | 9/2005 | Beyer et al. | |
| 2005/0222996 A1 | 10/2005 | Yalamanchi | |

FOREIGN PATENT DOCUMENTS

| | | |
|---|---|---|
| EP | 0772319 A2 | 5/1997 |
| EP | 0959416 A2 | 11/1999 |
| JP | 6-325093 | 11/1994 |
| JP | 10-222517 | 8/1998 |
| JP | 10-232877 | 9/1998 |
| JP | 2001-273330 | 10/2001 |
| WO | WO 01/08048 A | 2/2001 |
| WO | WO 03/098479 A2 | 11/2003 |

OTHER PUBLICATIONS

International Searching Authority, "Notification of Transmittal of the International Search Report or the Declaration," dated May 25, 2004, 6 pages.

Kei Kurakawa et al., "Life Cycle Design Support Based on Environmental Information Sharing," IEEE, Feb. 1-3, 1999, Proceedings EcoDesign '99, First International Symposium, pp. 138-142.

Oliver Gunther, et al., "MMM: A Web-Based System for Sharing Statistical Computing Modules," IEEE, May-Jun. 1997, vol. 1, Issue 3, pp. 59-68.

International Preliminary Examining Authority, "Notification of Transmittal of the International Preliminary Examination Report," PCT/US2005/009598, dated Oct. 7, 2006, 6 pages.

Amended Claims, PCT/US2005/009598, 6 pages (attached).

Paton, Norman W. et al., "Active database systems", ACM Computing Surveys (CSUR), vol. 31, No. 1, Mar. 1999, XP-002354519, 42 pages.

Grosof, Benjamin N. et al., "SweetDeal: representing agent contracts with exceptions using XML rules, ontologies, and process descriptions", Proceedings of the 12$^{th}$ International Conference on World Wide Web, May 2003, XP-002354520, 10 pages.

Molina, H, et al., "Database Systems The Complete Book", Prentice Hall, ISBN: 0-13-098043-9, 2002, 36 pages.

Claims, PCT/US2005/009598, 6 pages.

European Patent Office, "Communication Pursuant to Article 94(3) EPC", PCT/US2005/009598, received Feb. 22, 2008, 9 pages.

Dong, Yue, et al., "An Intelligent Database for Engineering Applications", Artificial Intelligence in Engineering, vol. 12, Jan./Apr. 1998, 14 pages.

Japanese Patent Office, "Notice of Grounds of Rejection", foreign patent Application No. 292882/2006, mailed Jan. 22, 2008, 6 pages.

Claims, Application No. 292882/2006, 9 pages.

Office Action from CN for foreign patent application No. 03821299.4 dated Dec. 24, 2007 (4 pgs) with English translation (4 pgs).

Current claims in CN for foreign patent application No. 03821299.4 (6 pgs).

Current claims in CN for foreign patent application No. 03821299.4 (6 pgs), 2003.

Randy Urbano, et al., "Oracle9i Streams, Release 2 (9.2)," Oracle Corporation, Mar. 2002, 736 pages.

Current Claims in PCT application, International Application No. PCT/US03/23747, 14 page, 2003.

* cited by examiner

RULES FOR PERFORMING ROW MIGRATION (i.e. for converting update operations to insert or delete operations)

Rules 401 insert rule 403 — operation_type IN ('insert', 'update') AND (new_city IS PRESENT) AND (new_city='Madrid') AND ((operation_type='insert') OR ((old_city IS PRESENT) AND NOT EXISTS (select 1 from dual where (old_city='Madrid'))))

update rule 405 — operation_type='update' AND (new_city IS PRESENT) AND (new_city='Madrid') AND (old_city IS PRESENT) AND (old_city='Madrid')

delete rule 407 — operation_type IN ('delete', 'update') AND (old_city IS PRESENT) and (old_city='Madrid') AND ((operation='delete') OR ((new_city IS PRESENT) AND NOT EXISTS (select 1 from dual where new_city='Madrid'))))

FIG. 4

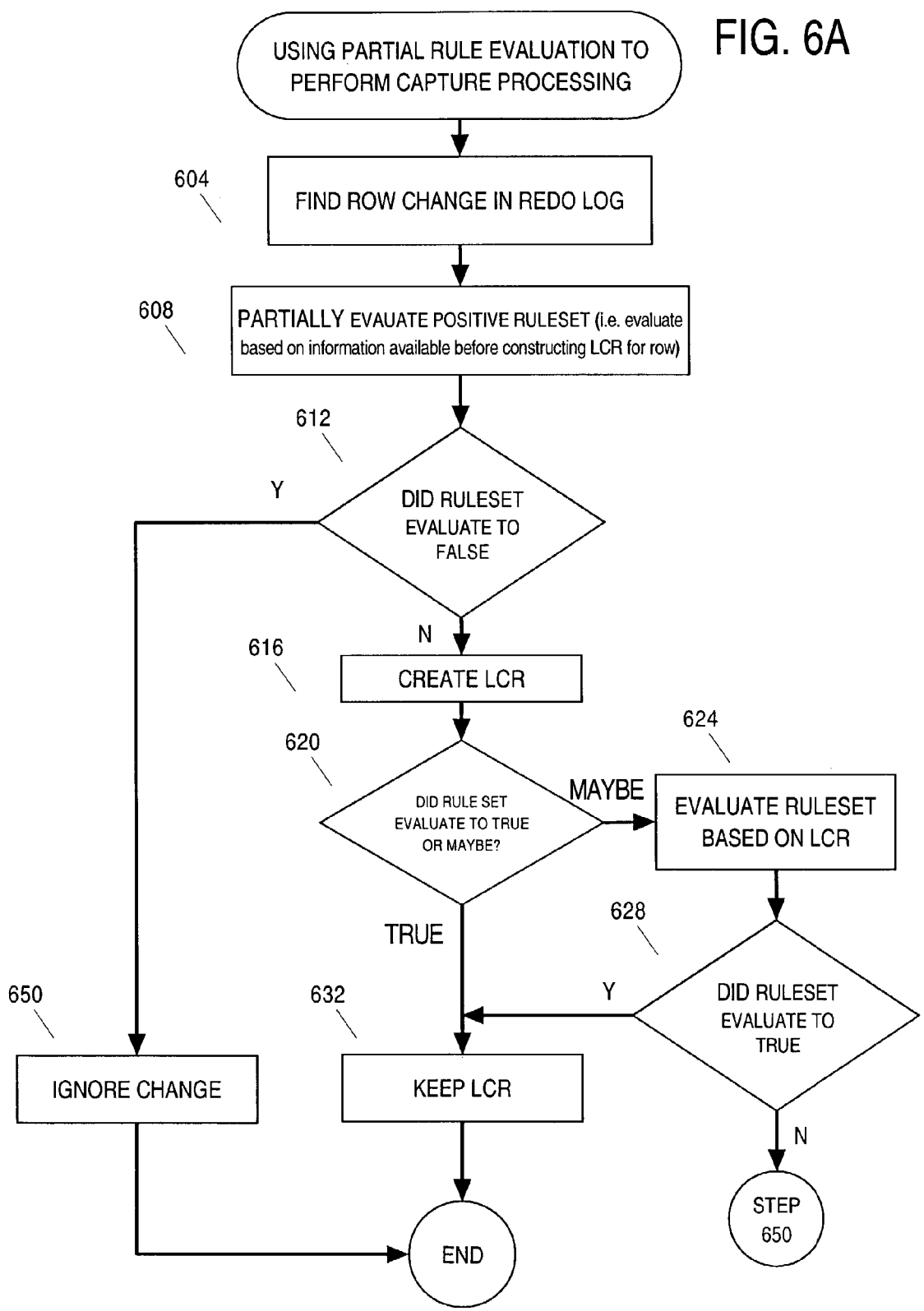

|  | POSITIVE RULE SET | | |
|---|---|---|---|
| NEGATIVE RULE SET | TRUE | MAYBE | FALSE |
| TRUE | DISCARD | DISCARD | DISCARD |
| MAYBE | UNKNOWN | UNKNOWN | DISCARD |
| FALSE | KEEP | UNKNOWN | DISCARD |

Grid 651

LCRs 740

| Source_DB | Source_Table | Other columns |
|---|---|---|
| ATLANTA | SALES | customer_id = 1<br>Amount = "100.00"<br>Date = "3/26/03" | / 741
| ATLANTA | CUSTOMER | customer_id = 10<br>customer_name = "ACME" | / 742
| ATLANTA | ORDER | Customer_id = 10<br>customer_name = "ACME"<br>Amount = "500.00" | / 743
| ATLANTA | SALES | customer_id = 20<br>Amount = "500.00"<br>Date = "3/29/03" | / 744
| ATLANTA | CUSTOMER | customer_id = 30<br>customer_name = "BEST" | / 745

Rules Cache 710

HASH TABLE 720 (hash key = Source_DB, Source_Table)

| | |
|---|---|
| {'ATLANTA','sales'} | TRUE — 721 |
| {'ATLANTA','customer'} | MAYBE — 722 |
| {'ATLANTA','order'} | FALSE — 723 |

PARTIAL EVALUATION OF RULE SETS

RELATED APPLICATIONS

This application claims priority to the following applications: this application claims priority to U.S. Provisional Application No. 60/400,532, entitled Utilizing Rules in Distributed Information Sharing, filed on Aug. 1, 2002 by Edwina Lu, et al., the contents of which are incorporated herein by reference; this application claims priority to U.S. Provisional Application No. 60/410,883, entitled Oracle Streams, filed on Sep. 13, 2002 by Alan Downing, et al., the contents of which are incorporated herein by reference; this application is a continuation-in-part and claims priority to U.S. application Ser. No. 10/308,924, entitled Asynchronous Information Sharing System, filed on Dec. 2, 2002 now U.S. Pat. No. 6,889,231 by Benny Souder, et al., the contents of which are incorporated herein by reference; this application is a continuation-in-part of U.S. application Ser. No. 10/418,882, entitled Extensible Rules Engine in a Database Management System, filed on Apr. 17, 2003 by Sanjay Kaluskar, et al., the contents of which are incorporated herein by reference.

The present application is related to U.S. patent application Ser. No. 10/431,604, entitled On Demand Multi-version Data Dictionary to Support Distributed Applications, filed on May 8, 2003 by Lik Wong, et al., the contents of which are herein incorporated by reference.

FIELD OF THE INVENTION

The present invention relates to messaging systems, and in particular, processing rules to manage the flow of messages among a network of database servers.

BACKGROUND OF THE INVENTION

The ability to share information easily and in a timely fashion is a crucial requirement for any business environment. Consequently, information sharing has been supported by many mechanisms, such as discussions, mail, books, periodicals, and computer technology. Many computer-based technologies have evolved to promote the goal of information sharing, such as reports/statements, replication and messaging.

In a system that uses messaging, messages containing information about events are propagated through a network of nodes. Typically, the events involve activities that create or modify data, and messages transmitted to the network of nodes contain data about the information created or modified.

A network that uses messaging may be represented by directed graphs of nodes. Edges join the nodes, each edge representing a flow of messages from a "source" node to another adjacent "destination" node. For a given node, multiple edges can emanate from the node or terminate at the node. In addition, there can be cycles, representing messages flowing from a source node back to the source node along a path that may include one or more other nodes.

For the events that occur at a node, messages about the events are sent to other nodes. A node that receives a message performs some action in response to receiving a message, actions such as updating data stored on the node, and forwarding the message to other nodes. Furthermore, for a given message, a node may send the message to some of the connected nodes but not others.

The message flow needed from one system to another system may differ. Various types of messaging systems provide the ability for users to configure the message flow between nodes in a network. One type of messaging system, a rule-based messaging system, allows a user to specify rules that govern the flow of messages.

A rule specifies a condition and an action to perform if the condition is met. In general, rules comply with a rules language, which is like a computer language. Messaging systems that use rules expose information about events through variables or attributes that can be referenced by the rules. The condition in a rule may be expressed using boolean expressions that reference the variables and attributes. The rules may be used to select which events for which messages are sent to other nodes, and what to do with a message received from another node.

A context in which messaging systems are implemented are database systems. In such a messaging system, each node in the system is a database server and the events for which messages are propagated correspond to data manipulation changes ("DML changes") and data definition changes ("DDL changes") made by a database server. According to an implementation of a rule-based messaging system used for a database system, a capture process scans a redo log for DML or DDL changes and stages them into a queue for subsequent propagation to other database servers. The queued messages are captured and propagated to other database servers according to rules provided by the user.

The term "capture" or "capture events" is used herein to refer to selecting events and adding messages to a staging area for subsequent processing. A capture process captures events.

The phrase "propagate a message" is used herein to refer to the activity of distributing messages generated by a capture process to other nodes for subsequent processing. Message propagation may entail distributing messages from a staging area for one node to another staging area for subsequent processing at another node. A propagation process propagates messages. Propagating an event refers to propagating a message about the event.

FIG. 1 is a block diagram provided to illustrate a rule-based message system implementation for a database system. Referring to FIG. 1, it shows messaging system 101. Messaging system 101 includes three nodes, database server New York, database server Pittsburgh, and database server Chicago. Database server New York has a table sales. DML and DDL changes (e.g. updates, deletes, and inserts) made by database server New York are propagated via messaging system 101 to database servers Pittsburgh and Chicago so that changes may be reflected in their respective tables sales (not shown).

Database servers Pittsburgh and Chicago do not receive all DDL and DML changes made to table sales in database server New York. The particular changes propagated to database servers Pittsburgh and Chicago depend on the value of a column city (not shown). Changes to rows where the value of city equals 'Pittsburgh' are propagated to database server Pittsburgh; changes to rows where the value of city equals 'Chicago' are propagated to database server Chicago.

A capture process 103 captures changes to table sales at database server New York and, for each change, adds a message to message queue 105. Capture process 103 captures the changes by scanning a redo log (not shown) maintained by database server New York. A redo log contains records that specify changes to rows in tables maintained by database server New York. Capture process 103 scans the redo log for records specifying changes to rows in table sales, adding a message to message queue 105 for changes to a particular row.

Propagate process 107 propagates messages queued in message queue 105 to database server Pittsburgh and propagate process 113 propagates messages queued in message queue 105 to database server Chicago. Messages reflecting changes to a row having city value equal to 'Pittsburgh' are propagated to database server Pittsburgh. Messages reflecting changes to a row having a city value equal to 'Chicago' are propagated to database server Chicago.

Rules are used to decide what changes to capture and what messages to propagate. To determine what changes to what particular rows are captured, capture process 103 executes capture rules 109. The condition for a rule in capture rules 109 is expressed as a SQL expression that can reference a variable specifying the "source table" affected by a change or a column of the table. The following predicate expression is used in a rule to capture changes to source table sales.

source_table="sales"

Propagate processes 107 and 113 evaluate propagate rules 111 and 115, respectively, to determine how to propagate a message from message queue 105. A rule condition that specifies to propagate to database server Pittsburgh messages reflecting changes to a row with city value equal to 'Pittsburgh' may be expressed using the following predicate expression.

source_table="sales" AND
city="Pittsburgh"

While rules offer greater flexibility by allowing users to control message flow using user-supplied rules, rule-based messaging systems have many drawbacks. First among the drawbacks is that in many situations the set of rules needed to define a desired message flow can become very complicated and burdensome to develop and maintain. For example, it is often desirable to capture all changes to rows in table sales with various exceptions. Specifically, changes to rows with city equal to 'Pittsburgh' are captured with the exception of rows for particular customers. A column customer in table sales contains values representing customers. The typical approach for using rules to propagate messages for this situation is to generate a rule for each customer. If there are a lot of customers, then a lot of rules would need to be implemented. Furthermore, whenever rows for a new customer are inserted into table sales, and it is desired that changes for that customer be propagated, then another rule needs to be added. Over the course of time, many new rules would have to be added to support additional customers. The burden of maintaining rules to accommodate new customers can be onerous.

Another drawback is that propagating DML and DDL changes to other database servers may require a kind of action that cannot be effected using rules supported by a conventional messaging system. One type of action is transformation. Transformation refers to the process of transforming data in a message. Transformation is commonly used to transform data from a format used by a database server to another format used by another database sever. For example, a date column in table sales in Chicago may correspond to a day and time column in table sales in Pittsburgh. To propagate column changes to the date column from database server Chicago to the day and time column at database server Pittsburgh requires transforming a single value into the date column into two values for the day and time column. Conventional rule-based messaging systems provide no mechanism for specifying message transformation operations.

Another kind of action not supported by conventional rule-based systems is row migration operation. Row migration refers to a process for converting an update operation in the source database server to an insert or delete operation on a database server. Row migration is needed when data in a table on the source database system is "partitioned" between target database servers, that is some of the data in the table is replicated on one database server while another set of data is replicated on another database server. Some DML changes to the table are propagated to one database server while other DML changes to the table are propagated to another. An example of partitioned data is table sales on database server Chicago.

To demonstrate the need for row migration, the following illustration is provided. A row in table sales, with column city equal to 'Pittsburgh', has been propagated to database server Pittsburgh but not database server Chicago. As a result, there is a corresponding row in table sales on database server Pittsburgh but not database server Chicago. If on database server New York the value in column city for the row is updated from 'Pittsburgh' to 'Chicago', then to propagate the change properly the corresponding row at database server Pittsburgh should be deleted while a corresponding row in database server Chicago must be inserted. Row migration operations are not currently supported by conventional rule-based messaging systems.

Finally, another drawback to rules-based messaging systems is that rules are relatively expensive to execute in terms of computer resources, (e.g. CPU processing) as compared to executing other code written using other computer languages (e.g. machine code). For messaging systems that use a lot of rules, the heavy expense of executing the rules is compounded.

Based on the foregoing, it is clearly desirable to provide approaches that alleviate the complexity and burden of developing and maintaining rules in a rules based messaging system, that allow rules to be used to specify kinds of actions that are not supported by conventional rules-based systems, and that provide more efficient ways of executing rules.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a diagram showing rule conditions of rules that specify when to insert, delete, or update to perform row migration according to an embodiment of the present invention;

FIG. 6A is a flowchart depicting a process for performing partial evaluation according to an embodiment of the present invention;

FIG. 6B depicts a grid used to illustrate evaluation using negative and positive rule sets;

FIG. 7 depicts a rules cache for caching the results of rule set evaluation for a body of messages according to an embodiment of the present invention;

DETAILED DESCRIPTION OF THE INVENTION

A method and apparatus for processing rules in a rule-based messaging system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Described herein are various approaches that allow rules to be used to specify actions that were not supported by conventional rule-based messaging systems, that alleviate the complexity and burden of developing and maintaining rules in a rules-based messaging system, and that provide more efficient ways of evaluating rules. The approaches allow rules to specify user-defined transformation functions for transforming messages, to specify when and how to perform row migration, and to specify other types of actions. Rules are grouped into rule sets. Several types of rule sets, referred to as positive and negative rule sets, allow users to use rules that are less complex to develop and maintain. Rule sets are evaluated more efficiently by attempting to evaluate the rule set with less information than is needed to evaluate all the rules in the rule set, avoiding the additional processing required in order to make additional needed information available. Also, the results of rules evaluations that are based on a set of values are cached for later retrieval, avoiding re-evaluation of rules for a set of values for which an evaluation was already performed.

Figure 1:
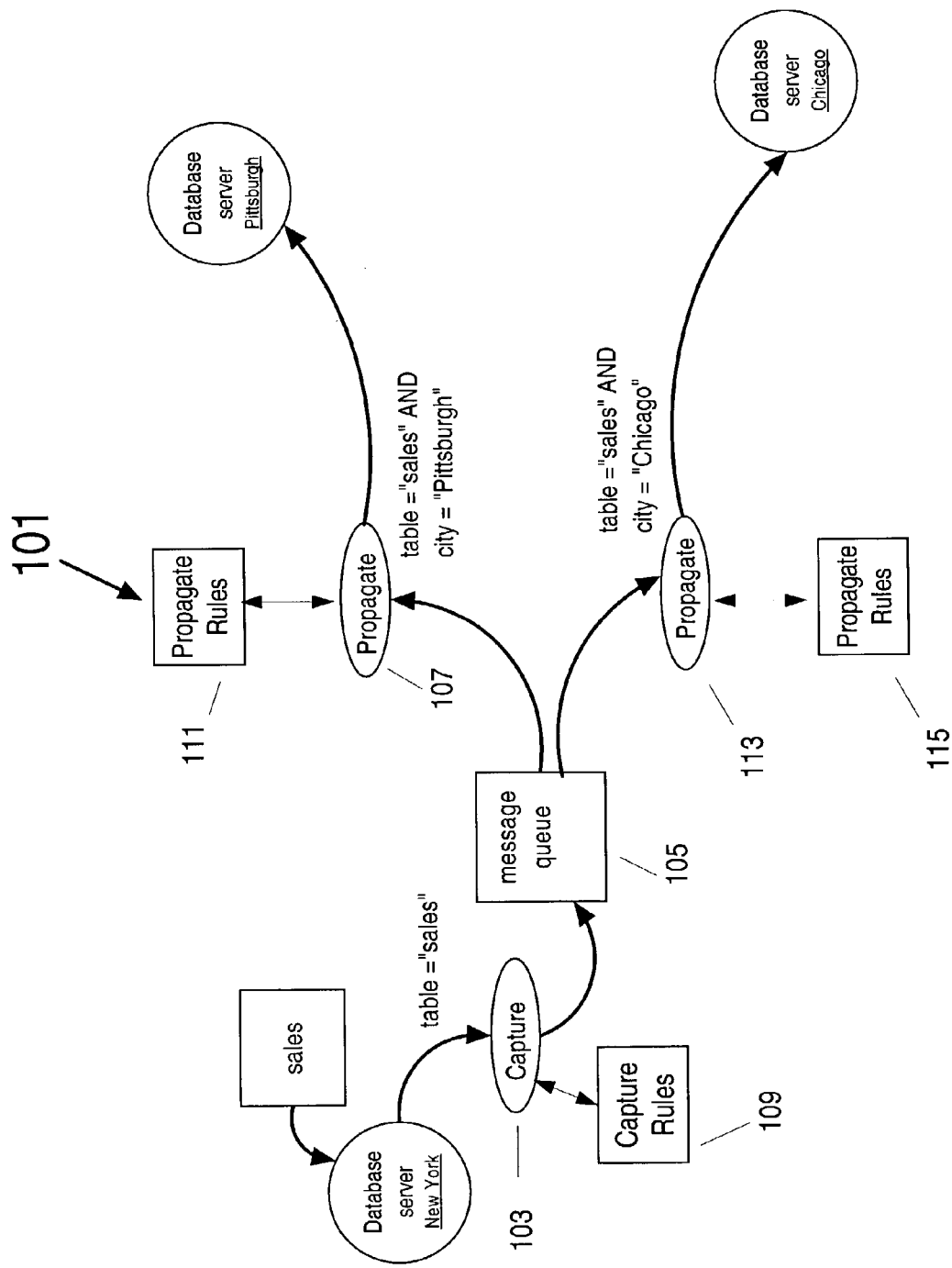
FIG. 1 is a block diagram depicting a rule-based messaging system used to propagate database changes among a network of database servers.
Figure 2:
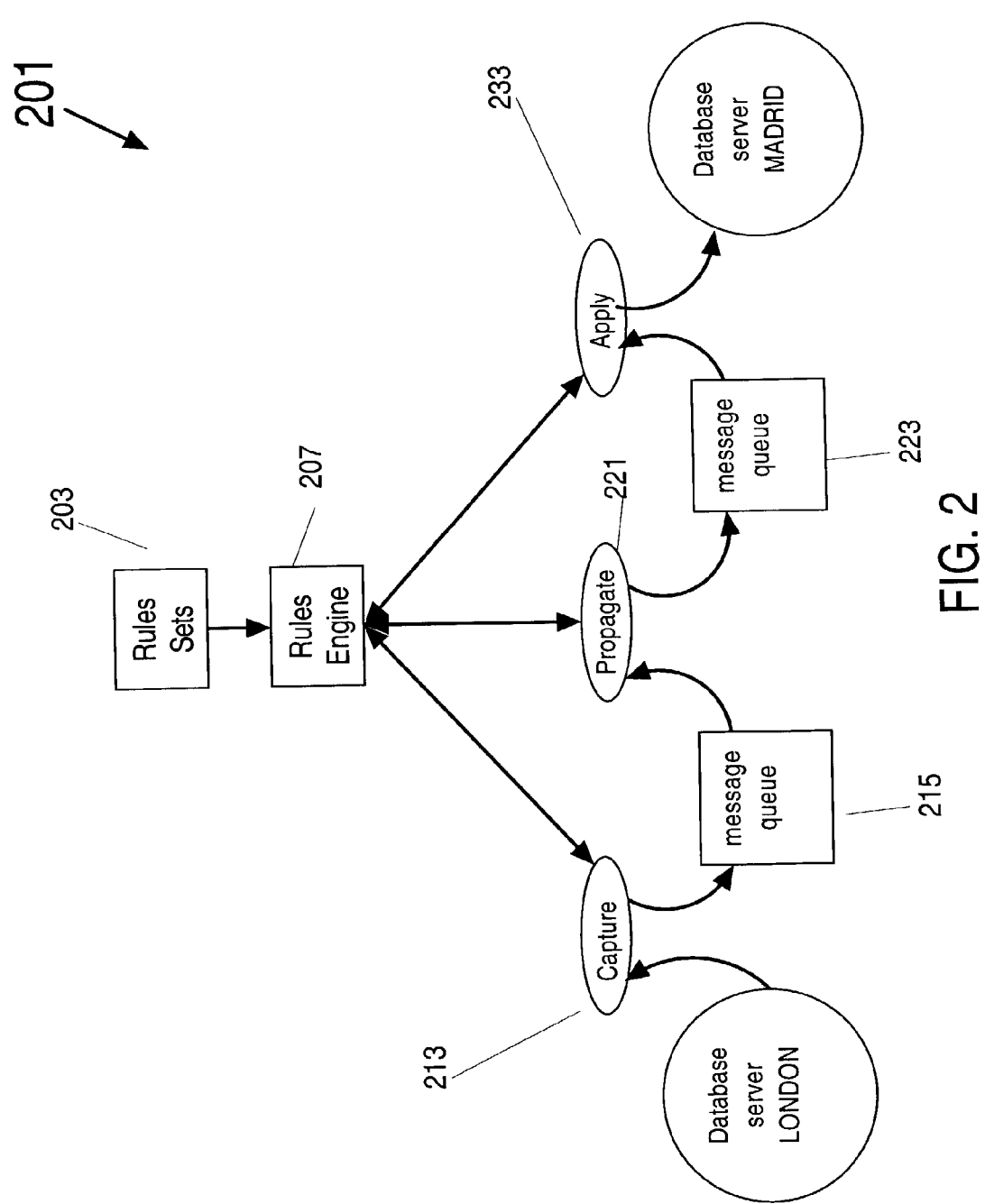
FIG. 2 is a block diagram depicting a rule-based messaging system used to propagate database changes among a network of database servers according to an embodiment of the present invention.

FIG. 2 shows a rule-based messaging 201, which is used to illustrate an embodiment of the present invention. Referring to FIG. 2, it shows database server LONDON, and capture process 213, which captures events (e.g. DML changes and DDL changes) from database server LONDON and queues messages reflecting those events into message queue 215. Propagate process 221 propagates messages from message queue 215 to message queue 223 and to other message queues not shown. Message queue 223 is a staging area for messages to be applied to database server MADRID. The term apply process refers to a process for reading messages in a staging area, such as queue MADRID, and causing the database server to take some action to reflect the event described by a message. For example, a message in message queue 223 that reflects a DML change made to a table in database server LONDON is applied to database server MADRID by making a corresponding change to a corresponding table in database server MADRID. Applying an event or change refers to applying a message about the event. Processes that capture, propagate, or apply events are referred to herein as message flow processes or flow processes.

Rules engine 207 executes rules in response to requests from clients to evaluate a rule set, and then returns the evaluation results of evaluating the rule set to the clients. Clients of rules engine 207 include capture process 213, propagate process 221, and apply process 233. Capture process 213, propagate process 221, and apply process 233 use the results of rules evaluation provided by rules engine 207 to determine how to process events and messages. This is accomplished by transmitting a request to execute rule sets to rules engine 207. In response to such a request, rules engine 207 executes one or more rule sets from rule sets 203.

For purposes of exposition, FIG. 2 shows only one set of rule sets. According to another embodiment, an apply, capture, or propagate process that processes messages for a database server would use a separate rules engine and set of rules sets that are both local to the database server.

A client of rules engine 207 requests evaluation of a rule set by calling rules engine 207. According to an embodiment, a rule set is the basic unit of evaluation, and evaluates to TRUE, FALSE, or NULL (unknown). Each rule in the rule set may also evaluate to TRUE, FALSE, or NULL. If any rule evaluates to TRUE in a rule set, then the rule set evaluates to TRUE. Otherwise, the rule set evaluates to FALSE (or other values as described below.) A single rule may belong to multiple rule sets. As explained in greater detail below, rules may specify one or more actions.

To evaluate a rule set, rules engine 207 evaluates each rule in the rule set, one after another, and stops when a rule evaluates to TRUE. The rules engine returns what the rule set evaluated to, and if TRUE, which rule evaluated to TRUE, and the one or more actions the rule specifies, if any.

According to another embodiment, rules engine 207 evaluates all rules in a rule set, rather than stopping when a rule evaluates to TRUE. The evaluation results returned to the client include which rules evaluated to TRUE, and the actions these rules specify.

A rule is referred to herein as being TRUE or FALSE as a convenient way of expressing that a rule evaluates to TRUE or FALSE. Likewise, a rule set is referred to as being TRUE or FALSE if the rule set evaluates to TRUE or FALSE.

It is up to the rules engine client how it responds to the evaluation results of a rule set. The client may perform a particular action only if a rule set is TRUE or only if a rule set is FALSE, and may perform some or all the actions returned in the evaluation results, and even perform actions that are not specified.

A client may request the evaluation of multiple rule sets. It may determine what actions to take based on any boolean combination of the evaluation results of the rule sets. For example, a capture process determines whether to capture a change based on three result sets A, B, and C. The capture process may capture a change only if all three rule sets evaluate to TRUE, or only if rule set A evaluates to TRUE and either rule set B or C evaluates to TRUE.

Various messaging systems that may be used in an embodiment of invention are described in Oracle 9i, Streams, Volumes 1 & 2 (Part Numbers B1007-01 and B1008-02, respectively, available from Oracle Corporation), the contents of which are incorporated herein by reference.

Elements of a Rule

According to an embodiment, a rule includes a rule condition, and may be associated with a rule evaluation context and a rule action context.

Similar to a condition in the WHERE clause of an SQL query, a rule condition combines one or more expressions and operators and returns a Boolean value, which can be TRUE, FALSE, or NULL (unknown). For example, the following rule condition may be used to specify that the schema name that owns a table must be hr and the table name must be departments for the condition to evaluate to TRUE:

object_owner='hr' AND source_table='departments'

The rule evaluation context defines external data that can be referenced in a rule's condition. The external data can either exist as external variables, as table data, or both. An evaluation context provides the necessary information for interpreting and evaluating the rule conditions that reference the external data. For example, a rules evaluation context name hr_evaluation_context contains the following information:

Table alias dep corresponds to the hr.departments table.
Variable loc_id1 and loc_id2 are both of the data type NUMBER.
Hr_evaluation_context provides the necessary information for evaluating the following rule condition:
dep.location_id IN (:loc_id1:loc_id2)

In this case, the rule condition evaluates to TRUE for a row in the hr.departments table if that row has a value in the location_id column that corresponds to either of the values in the evaluation context for the loc_id1 or loc_id2 variable. The rules cannot be interpreted or evaluated properly without the information in hr_evaluation_context.

When a client calls rules engine 207, the client not only passes in information that may be used to determine what rule sets to evaluate, but also what evaluation context to use. The rules engine evaluates the rules based on the relevant evaluation context. Only rules that use the specified evaluation context are evaluated.

The rule action context is optional information associated with a rule that is interpreted by the client of the rules engine when the rule is evaluated. It contains information that provides a context for any action to be taken by the client when a rule evaluates to TRUE. Rules engine 207 does not interpret the action context. Instead, it returns the action context when a rule evaluates to TRUE. It is up to the client to interpret the information provided in the action context. The information is provided in the form of name-value pairs.

For example, a new row, representing an employee, is added to table hr.employee, which contains a column department_id. A number of actions are to be taken depending on the value of department_id of the row being inserted. These actions include that the new employee is to be enrolled in the course depending on the value in department_id. A rule may be created for each department, each rule being associated with an action context that specifies the course, as follows.

| Rule Name | Rule Condition | Name-Value Pair |
| --- | --- | --- |
| rule_dep_10 | deparment_id = 10 | course_number, 1057 |
| rule_dep_20 | deparment_id = 20 | course_number, 1215 |
| rule_dep_30 | deparment_id = 30 | NULL |

Each of the rules instructs whether an employee should be enrolled in a particular course. Rule rule_dep_10 instructs that an employee is to be enrolled in course number 1057 if department_id equals 10 and enrolled in course number 1215 if department_id equals 20. Rule_dep_30 instructs that an employee is to be enrolled in no course if department_id=30.

Users may define rules, rules sets, evaluation contexts, and action contexts by registering them with a database server. Rules, rules sets, and action contexts may be registered by invoking a database server procedure.

Logical Change Records

Capture process 213 retrieves the DML and DDL change data from a redo log, and formats the change data into a data structure referred to as a Logical Change Record ("LCR"). Information in the LCR can be accessed as an attribute of a rules evaluation context. If for an LCR a rule set is TRUE, the capture process places the LCR as a message into message queue 215. As mentioned above, changes made to database objects in a typical database are logged into a redo log to guarantee recoverability in the event of user error or media failure. According to an embodiment, there are several types of LCRs: (1) row LCRs, which contain information about a change to a row in a table resulting from a DML operation, and (2) DDL LCRs, which contain information about a DDL change to a database object.

Messages queued on message queue 223 include LCRs. Propagate process 221 and apply process 233 process messages in the form of LCRs as well.

Figure 3:
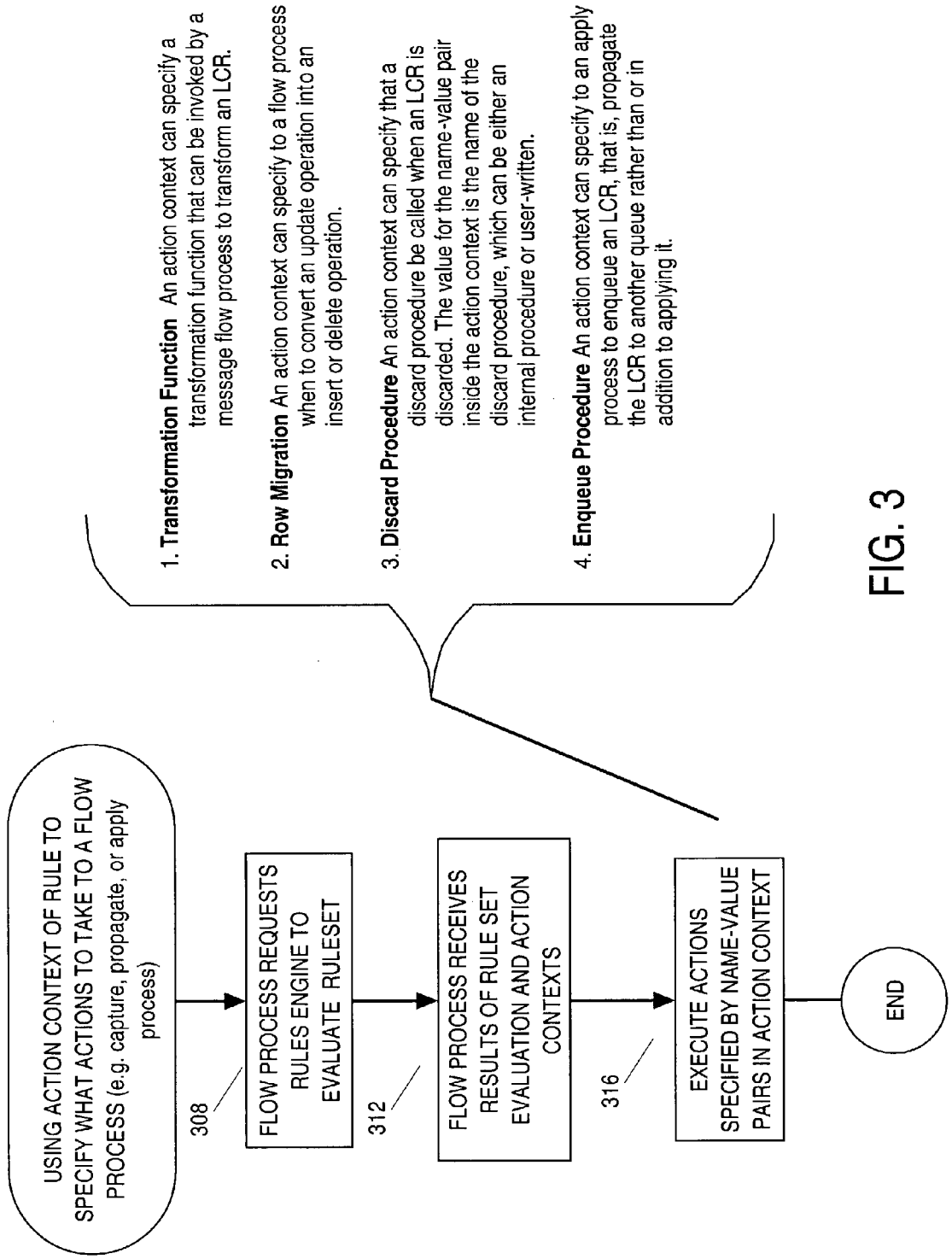
FIG. 3 is a flow chart depicting a process for using a rules action context to specify when to perform a transformation function, row migration, discard procedure, and enqueue procedure according to an embodiment of the present invention.

Using Action Contexts Provided by a Rule to Specify Actions to be Taken by Flow Processes As demonstrated above, rules can provide an action context that specifies one or more actions to be taken by a flow process. According to an embodiment of the present invention, an action context can be used to specify such actions as user-defined transformations, row migration, enqueuing (propagation caused by an apply process), and invocation of a discard procedure. FIG. 3 depicts a flowchart providing an overview of an approach for using action contexts in this way. At step 308, a flow process requests rules engine 207 to evaluate one or more rule sets. At step 312, the flow process receives the results of the evaluation and action contexts. At step 316, the flow process executes the actions specified in the action contexts.

An action context for a particular rule can specify more than one action. Each action is specified by a specific name-value pair. The value in the name-value pair can store additional information needed for performing the specified action.

User-defined transformations provide a way for users to specify a transformation function that can be called to modify an LCR when the rule specifying the transformation function is TRUE. User-defined transformation functions are functions that are registered by a user with a database server, using for example, a database server procedure that may be invoked by a user to register a particular function. The transformation function gives users the ability to modify the LCR. By modifying the LCR, the user is able to transform the message to, for example, convert data stored in the changed columns of a row to a format used by corresponding columns on a destination database server.

Given one input value, a transformation function can return zero, one, or more values. Thus, transformation can be used to support one-to-many transformations.

For purposes of illustration, both database server LONDON and MADRID have a table sales. Changes made to the table at LONDON are propagated to database server MADRID, which applies the changes to a table sales at database server MADRID. A date column in table sales on database server LONDON corresponds to a day column and time column in table sales on database server MADRID. When apply process 233 receives an LCR reflecting a change to a column of a row in table sales in LONDON, the apply process invokes rules engine 207. Evaluation of the rule set causes rules engine 207 to return a transformation function in an action context. The transformation function, when invoked by apply process 233, performs a transformation by modifying the LCR, replacing the date column value with values for the day column and time column for table sales at database server MADRID.

Row migration is provided by a rule set that specifies three rules for inserting, deleting, and updating. For an LCR representing a change to a row, the insert rule specifies the conditions under which to insert a row, the delete rule specifies the conditions under which to delete a row, and the update rule specifies the conditions under which to update a row.

Each of these three types of rules includes an action context that identifies either the insert, delete, or update action.

FIG. 4 is a diagram showing rules 401 that are used for row migration of rows from table sales in database server LONDON. Table sales on database server LONDON is partitioned such that only rows with a column city equal to 'Madrid' are replicated on database server MADRID. Messages for all changes to sales are propagated to message queue 223. Apply process 233 uses rules in rule set 203 to determine when to perform an insert, delete, or update operation for the purpose of performing row migration.

Referring to FIG. 4, it shows conditions for insert rule 403, update rule 405, and delete rule 407. These rules refer to the LCR attributes operation_type, new_city, and old_city. Operation type specifies whether a change reflected by an LCR is for either an insert, delete, or update of a row in table sales on database server LONDON. The value of old_city and new_city depends on the operation type. For LCRs representing an insert, new_city specifies the value in the city column and old city is not present. For LCRs representing deletes, new_city is not present and old_city specifies the value of the column city when the row was deleted. For updates, new_city contains the new value of column city that results from the update operation, and old_city reflects the previous value of city. If an update operation does not change the value of city, new_city and old_city are equal.

The conditions for insert rule 403 are satisfied if an LCR represents an insert of a row whose column value is equal to 'Madrid', or if the LCR represents an update that changes the value of city to 'Madrid'. The conditions for update rule 405 are satisfied if an LCR represents an update for which column city was not changed from 'Madrid'. The conditions for delete rule 407 are satisfied if an LCR represents a delete of a row whose value in city was 'Madrid', or an update that changed the value of city from 'Madrid' to some other value.

LCRs which satisfy insert rule 403, update rule 405, or delete rule 407 must either already be in a form for or be converted into a form for an insert, update, or delete operation. The conversion can be specified in a transformation function. Users can define the needed insert, update, or delete rules. To convert update changes to inserts, the LCR contains all the new values of the updated columns and all the old values of non-updated columns. To convert update changes to deletes, the LCR contains all the old values needed to perform a delete.

LCRs representing updates are a special case. The LCR may need to be modified if the update requires an insert or delete of a row at the destination database server. If a row is updated in a way so that it should be deleted at a database server to which it was already propagated, it should satisfy a delete rule, and the delete is performed in place of an update. If a row is updated in a way so that it should be inserted at a database server to which the row was never propagated, it should satisfy an insert rule.

The action context of a rule can specify both a transformation and row migration operation. (In fact, the action context can specify any combination of the actions transformation, row migration, enqueue, and discard). For example, insert rule 403 can specify a transformation action to transform a value in a column of an LCR before applying it. Furthermore, a capture process can perform a row migration operation for a message. An apply process downstream can perform a transformation before applying the message.

An action context can specify to an apply process to enqueue an LCR, that is, propagate the LCR to another queue. This action is specified using the action context, and the value for the name-value pair inside the action context stores the queue name. Another name-value pair in the action context specifies whether, when enqueue is specified, the LCR should also be applied.

An action context can specify that a discard procedure is to be called when an LCR is discarded. The value for the name-value pair inside the action context is the name of the discard procedure, which can be either an internal procedure or user-written.

Positive Rule Sets and Negative Rule Sets

According to an embodiment of the present invention, a message flow process processes rule sets as positive rule sets or negative rule sets when using rules to determine how to process an LCR.

A message flow process may use a positive rule set, negative rule set, or a combination thereof, to determine whether or not to keep or discard an LCR. The meaning of the terms "keep an LCR" or "discard an LCR" depends on whether it is being used within the context of a capture, propagation, or apply process. For a capture process, an LCR is kept by adding it to a message queue; for a propagation process, the LCR is kept by propagating it; for an apply process, the LCR is kept by applying it. An LCR that is not kept is referred to as being discarded.

For positive rule sets, if the rule set evaluates to TRUE, then the flow process keeps the LCR. Thus, if any rule in a positive rule set is TRUE, then the rule set is TRUE, and the LCR is kept.

For negative rule sets, if the rule set evaluates to FALSE, the LCR is kept. Thus, if all rules in the rule set are FALSE, then the rule set is FALSE, and the LCR is kept. If any rule in the rule set is TRUE, then the rule set result is TRUE, and the LCR is discarded.

In general, a positive rule set can be expressed as an equivalent negative rule set. There are many scenarios in which a less complex negative rule set with less rules may be used in lieu of a more complex positive rule set with more rules, saving the cost of developing and maintaining more complicated rule sets, and the cost of evaluating a larger set of rules.

For purposes of illustration, reference is made to the previous example for table sales, in which changes to rows with city='Pittsburgh' were captured with the exception of the rows that have particular values in customer_id. Using a positive rule set, a rule set can be provided for each customer value for which a row is propagated. If there are a lot of customers, a lot of rules would have to be developed. As rows representing new customers were added, new rules need to be added to the positive rule set. If there were relatively few customer values for which rows are not propagated, a negative rule set would be far less complicated to develop. The negative rule set would have one rule for each customer value for which rows are not propagated, as shown below for rule set do_not_capture_customers.

Negative Rule Set DO_NOT_CAPTURE_CUSTOMERS

| Rule Name | Rule Condition |
|---|---|
| rule_cust_ACME | customer_ID = 1 |
| rule_cust_XL | customer_ID = 20 |
| rule_cust_BEST | customer_ID = 30 |

An LCR would only be propagated if rule set DO_NOT_CAPTURE_CUSTOMERS is FALSE. In order for the rule set to evaluate to FALSE, each of the rules in the rule set would have to be FALSE.

For example, assume the column customer_id for an LCR representing a row inserted into table sales equals i. In this case, rule_cust_ACME is TRUE, and rule set DO_NOT_CAPTURE_CUSTOMERS is TRUE, and the LCR is not captured. On the other hand, if for the LCR customer_id="50", all rules are FALSE, rule set DO_NOT_CAPTURE_CUSTOMERS is FALSE, and the LCR would be kept.

An equivalent positive rule set for DO_NOT_CAPTURE_CUSTOMERS could have a rule for each customer value for which rows are to be propagated. Assuming there are far more of customer values for which rows are to be propagated, the positive rule set would be much larger and far more complex to maintain and far more expensive to evaluate.

Figure 5:
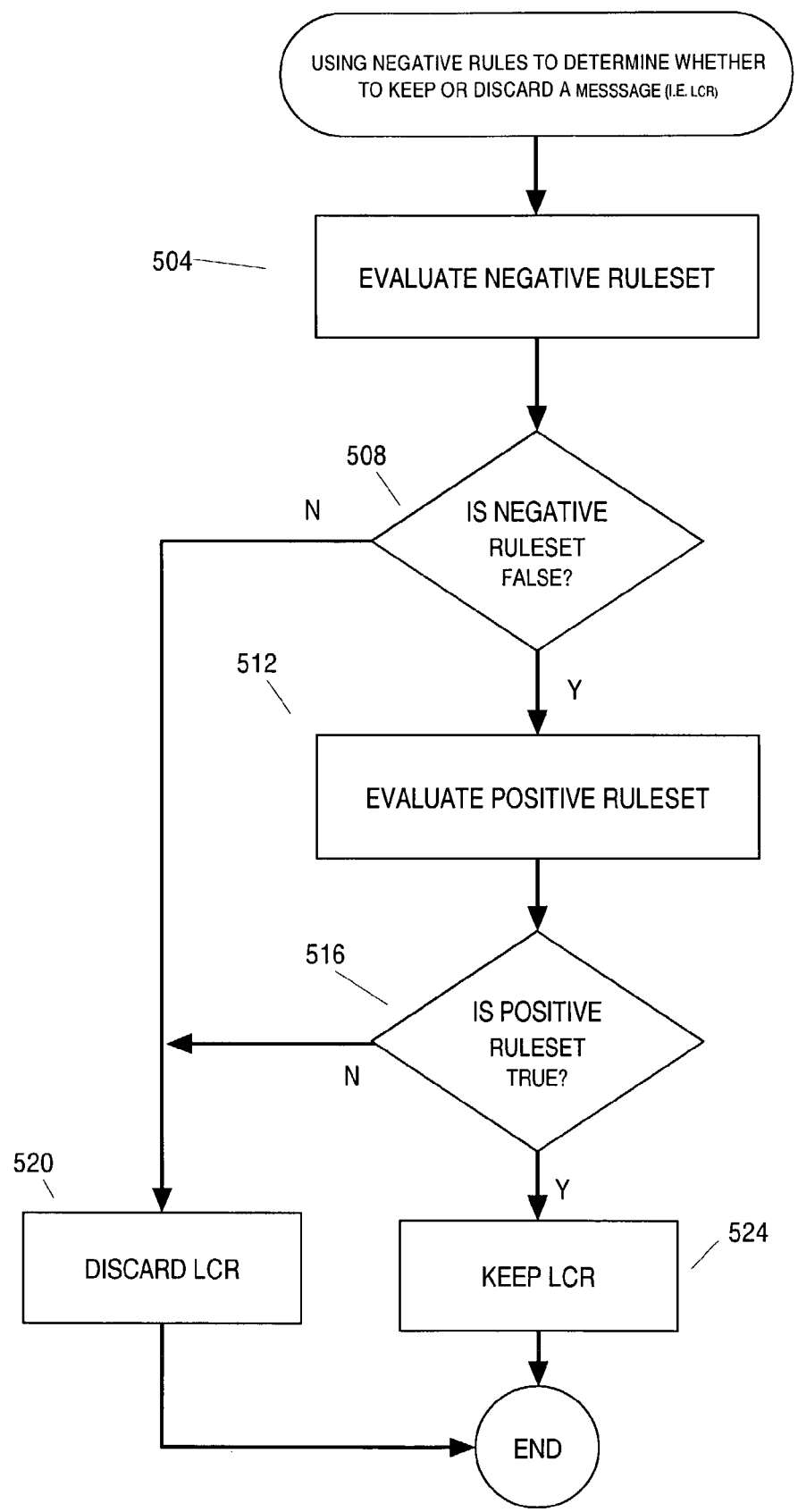
FIG. 5 is a flowchart depicting a process for evaluating a combination of a negative rule set and a positive rule set according to an embodiment of the present invention.

A flow process may use a negative and positive rule set to determine whether to keep or discard LCRs. According to an embodiment, a negative rule set that is TRUE is evaluated first and treated as being dispositive, that is, if the negative rule set is TRUE, the LCR is discarded and the positive rule set is ignored and not evaluated. The positive rule set is only evaluated if the negative rule set is FALSE. LCRs filtered (i.e. discarded) by the negative rule set are not evaluated under the positive rule set, and no actions specified by the positive rule set can be undertaken for the LCR. FIG. 5 shows a flow chart depicting a flow process that uses negative and positive rules sets in this way.

Referring to FIG. 5, at step 504, the negative rule set is evaluated for the LCR. At step 508, it is determined whether the negative rule set evaluated to FALSE. If the negative rule set is TRUE, then at step 520, the LCR is discarded, the positive rule set is not evaluated, and execution of the steps ceases. In this way, a negative rule set may be used as a security mechanism to filter LCRs from evaluation under a positive rule set, preventing any actions that could be triggered by the evaluation results of the positive rule set.

At step 512, the positive rule set is evaluated for the LCR. At step 516, it is determined whether the positive rule set evaluated to TRUE. If so, then at step 524, the LCR is kept and execution of the steps ceases.

Partial Evaluation

During capture processing, LCRs are constructed. There may be rules in a rule set used by the capture process that require information contained in an LCR in order to be evaluated. On the other hand, some rules can be fully evaluated based on information that is available during the capture process after reading a change record from a redo log but before constructing the LCR. Thus, it is possible to determine the result of a rule and a rule set before constructing an LCR. Information available before constructing an LCR includes, for example, information that identifies a source database, schema, and source table version for a particular change to a row. Information that would not be available includes, for example, values in columns of a changed row.

For purposes of illustration, the positive rule set PART_EVAL is used to capture DML changes at a database server ATLANTA.

| Rule Name | Rule Condition |
| --- | --- |
| rule_sales_table | source_table = 'sales' |
| rule_customer_table | source_table = customer' and customer.customer_id > 6 |

The rules in PART_EVAL cause all DML changes to rows in table sales to be captured and all changes to rows in table customer where column customer_id is greater than 6 to be captured. Information that is available for a changed row before constructing an LCR includes source_DB (source database, i.e. database where change originated) and source_table but does not include information regarding the column values in the changed row. The database server includes another table order whose changes are not captured.

For a change to a row in table sales, before having to construct an LCR, it can be determined that rule_sales_table evaluates to TRUE. Because PART_EVAL is a positive rule set, and at least one rule, rule_sales_table, is TRUE, the rule set must also be TRUE.

For a change to a table order, before having to construct an LCR, it can be determined that both rule_sales_table and rule_customer_table must evaluate to FALSE. Because PART_EVAL is a positive rule set, and all its rules are FALSE, its result must also be FALSE.

However, for a change to a row in table customer, it cannot be determined whether rule_customer_table is FALSE or TRUE before constructing the LCR because the rule condition depends on the value of column customer_id.

Constructing LCRs requires a non-negligible amount of work. According to an embodiment, an attempt is undertaken to evaluate a rule set before constructing an LCR using information that is available before constructing the LCR. Attempting an evaluation in this way is referred to herein as partial evaluation. The information available with which to perform the evaluation is referred to herein as the partial evaluation data set. If results generated during partial evaluation dictate that a change need not be captured, an LCR is not generated and the expense of constructing and further evaluating the rule set is thereby avoided. If the results, on the other hand, dictate that a change is to be captured, an LCR is created and added to the message without further evaluation of the rule set, thereby saving the cost of an evaluation. Rule sets whose results cannot be determined by partial evaluation are subject to further evaluation after constructing the LCR.

If under partial evaluation, it can be determined that a rule set must be TRUE or FALSE, the result of partial evaluation is deemed to be TRUE or FALSE. If, however, under partial evaluation the result of a rule set cannot be determined to necessarily be either TRUE or FALSE, the result is deemed to be 'MAYBE'.

FIG. 6A shows a process that uses partial evaluation to more efficiently perform capture processing. In this process, a positive rule set is used to determine whether an LCR is to be kept for a row change, the LCR being kept if the positive rule set is TRUE.

Referring to FIG. 6A, at step 604, a row change is found in the redo log. At step 608, the positive rule set is partially evaluated. At step 612, it is determined whether the positive rule set evaluated to FALSE based on the partial evaluation. If so, execution proceeds to step 650, where the change is ignored. Otherwise, execution proceeds to step 616, where an LCR is created.

At step 620, it is determined whether the rule set evaluated to TRUE or MAYBE based on the partial evaluation performed at step 608. If the rule set evaluates to TRUE, the execution proceeds to step 632, where the LCR is kept. Otherwise, if the rule set evaluated to MAYBE, execution proceeds to step 624.

At step 624, the rule set is evaluated based on the LCR.

At step 628, it is determined whether the rule set evaluated to TRUE based on the evaluation at step 624. If so, the LCR is kept at step 632. Otherwise, the LCR is discarded.

Partial evaluation has been illustrated using capture processing. However, the present invention is not so limited. In general, partial evaluation may be used in and is useful to situations where messages are processed in stages, and partial information about the message is available at an earlier stage and the results of partial evaluation may be used to avoid further processing in a subsequent stage.

Furthermore, partial evaluation may be performed at multiple stages—at a stage when some partial information is available, and at a later stage when more partial information is available. For example, when a capture process reads a redo log, partial evaluation may be performed when information about the schema and object is available, and then later when additional information about column values is available.

Neither is partial evaluation limited to flow processes that use only a positive rule set to determine whether to keep or discard an LCR. FIG. 6B is a chart depicting how partial evaluation may be used with a negative rule set and positive rule set, where a capture process keeps a change if the negative rule set evaluates to FALSE and the positive rule set evaluates to TRUE. Referring to FIG. 6B, it shows a table with cells, each cell corresponding to a particular action that is performed for a particular combination of results under partial evaluation for a negative or positive rule set. For example, cell 652 corresponds to TRUE under partial evaluation for both the negative rule set and the positive rule set. In this case, a change is discarded and an LCR is not constructed. Cell 653 corresponds to FALSE for the negative rule set and TRUE for the positive result set. In this case, an LCR is kept. Cell 654 corresponds to FALSE for the negative rule set and MAYBE for the positive rule set. In this case, it cannot be determined whether to keep or discard a message without constructing the LCR and performing a full evaluation.

Rules Cache

Evaluation of rule sets has a nonnegligible cost, because it can entail the evaluation of each rule in a rule set. According to an embodiment of the present invention, a rule set is partially evaluated using a subset of attributes about a message, and the result of the evaluation is stored in a rules cache. When subsequently partially evaluating the rule set for another message, the rules cache may be accessed to retrieve the previously evaluated result for the rule set. Specifically, the results of partial evaluation for a rule set are stored in a hash table, using the partial evaluation data set as hash key values. When subsequently partially evaluating the rule set for another message, the hash table is accessed to attempt to retrieve an already computed result for the rule set using the partial evaluation data set. If the result based on the partial evaluation data set has already been determined for the rule set, it can be found in the hash table.

FIG. 7 shows a rules cache used to cache the results of partial evaluation according to an embodiment of the present invention. The embodiment is illustrated using LCRs 740 and rule set PART_EVAL, shown above.

Referring to FIG. 7, rules cache 710 is used to store the results of partial evaluation of rule sets, such as the results generated by the partial evaluation illustrated in FIG. 6A. Rules cache 710 contains a hash table for each rule set whose results are being cached. Rules cache 710 includes hash table 720, which caches evaluation results for rule set PART_EVAL. The hash keys for the hash table are source_DB and source_table, which are part of the partial evaluation data set.

For a particular message, a hash key function is applied to the hash key values to generate a hash value that identifies an entry in hash table 720. In this way, a particular set of hash key values corresponds to a particular entry in hash table 720. Hash key values {'ATLANTA','sales'} correspond to entry 721, hash key values {'ATLANTA','customer'} correspond to entry 722.

The result generated for LCR 741 during partial evaluation is TRUE. The hash key values for LCR 741 are {'ATLANTA', 'sales'}, which correspond to entry 721. Accordingly, the result of TRUE is stored in entry 721.

The result generated for LCR 742 during partial evaluation is MAYBE. The hash key values for LCR 742 are {'ATLANTA','customer'}, which correspond to entry 722. Accordingly, the result MAYBE is stored in entry 722.

The result generated for LCR 743 during partial evaluation is FALSE. The hash key values for LCR 743 are {'ATLANTA','order'}, which correspond to entry 723. Accordingly, the result FALSE is stored in entry 723.

Before partially evaluating LCR 744, hash table 720 is searched to determine whether a result has been cached. The hash key values for LCR 744 are {'ATLANTA','sales'}, which correspond to entry 721. It holds the result of TRUE. Thus, the result of partial evaluation based on LCR 744 is determined by retrieving the result from hash table 720 and without having to perform the partial evaluation.

Before partially evaluating LCR 745, hash table 720 is searched to determine whether a result has been cached. The hash key values for LCR 745 are {'ATLANTA', 'customer'}, which correspond to entry 722. It holds the result of MAYBE. Thus, the result of partial evaluation is determined by accessing the result in hash table 720 and without having to perform the partial evaluation.

The process depicted in FIG. 6A can be modified to use the rules caching approach described above. For example, after step 604 but before step 608, an attempt is made to retrieve the result from the rules cache. If there is a cache hit, (i.e. a result for the partial evaluation data set and rule set is stored in the rules cache 710), step 608 is skipped and the result found in the cache is used in lieu of the result that would otherwise have been generated by performing step 608. If there is a cache miss (i.e. no result found in rules cache 710), then partial evaluation is undertaken at step 608. After performing step 608, the result generated is stored in rules cache 710.

Rule sets may be altered, which could alter the result of a rule set given a particular partial evaluation data set. Thus, when a rule set is altered, results for it in the rules cache are removed.

Preventing Change Cycling with Redo Tags

A messaging system may contain database servers that send their changes to each other. For purposes of illustration, in rule-based messaging system 201, messages representing DML changes are captured at database server MADRID and then propagated to database server LONDON. Thus, when a row is inserted into a table at database server LONDON, a message representing the change is propagated and applied to database server MADRID, causing a row to be inserted into a corresponding table at database server MADRID and a record in a redo log to be created to record the insert. A capture process, scanning the redo log at database server MADRID, captures the insert, which is then propagated, and applied to database server LONDON. Cycling of DML changes in this way is referred to herein as change cycling. As shown above, change cycling is caused by capturing a change at a database server made by an apply process to apply a change that originated at another database system. Change cycling can be prevented by avoiding the capture of such changes.

Figure 8:
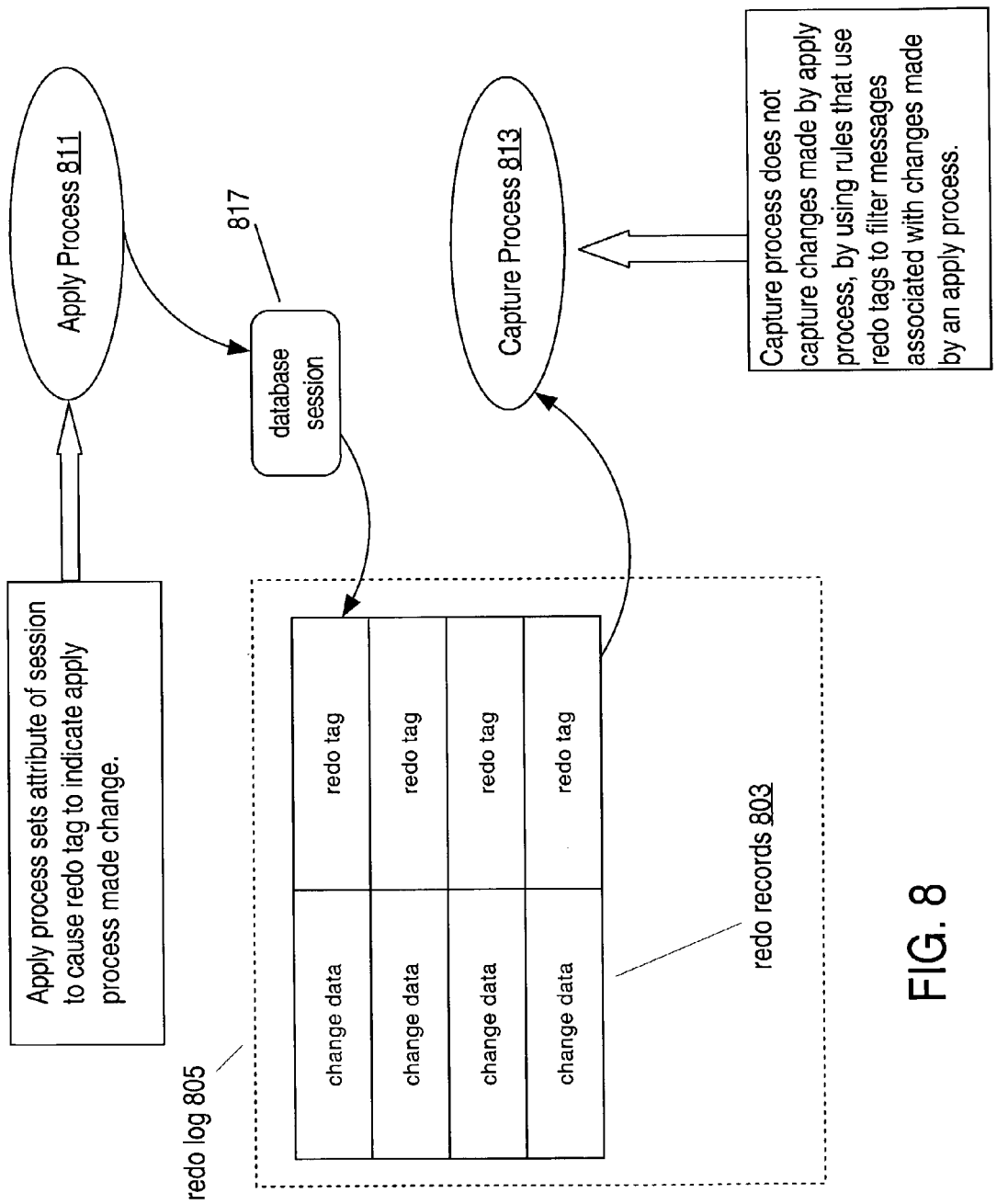
FIG. 8 depicts a redo log with redo tags referenced by rules to prevent applying changes that are made at a database server that originated the changes according to an embodiment of the present invention.

FIG. 8 is a block diagram depicting an approach for preventing the capture of changes made by an apply process. Referring to FIG. 8, it shows redo records 803 within redo log 805. Each of redo records 803 contains change data and redo tags. Each redo record represents a change to one or more rows (e.g. changes to rows in a data block). The change data specifies the changes made. A redo tag is a tag (i.e. field) containing data, separate from the change data, which may be set by a process running on a database server, such as an apply, propagation, or capture process. In an embodiment, a tag may be set to a value by setting an attribute associated with a database session on a database server, such as database session 817, to a value, causing changes made by the session to have that value in the tag. To indicate that a change was made by an apply process, apply process 811 sets a redo tag to a non-NULL value. A redo tag is an attribute of an LCR. A rule set used by a capture process 813 may contain conditions that reference a redo tag and that prevent the capture of DML changes if the redo tag indicates that the DML change was made by the apply process.

For example, the following rule condition may be used in a rule set to prevent the capturing of changes made by an apply process.

source_table='sales' and tag is NULL

The rule evaluates to TRUE if a DML change is not made to table sales by an apply process.

A redo tag may be part of a partial evaluation data set, and it may be used as a hash key for a hash table in a rules cache, such as hash table 720 in rules cache 710.

Other Embodiments

Embodiments of the present invention have been illustrated using LCRs as messages. However, the present invention is not so limited. For example, another type of message that may be transmitted on rule-based message system 201 are messages that represent a procedure call ("PCs"). Rules may be used by capture, apply, and propagate processes to determine what PCs to discard. In fact, partial evaluation for a PC may be performed based on such attributes as source database, object owner, and object name. PCs are used to maintain the multi-version data dictionaries of database servers interconnected by a rule-based messaging system, as described in On Demand Multi-version De-normalized Data Dictionary to Support Distributed Log-based Applications.

Neither is the present invention limited to rules engine clients or nodes in a messaging system that are database servers. For example, a node in rule-based messaging system 201 may be a messaging client with the capability of handling messages like a capture, apply, or propagation process. The messaging client can enqueue or dequeue messages from a message queue (such as message queues 215 and 223 shown in FIG. 2), and process the message, such processing including modifying the message or performing an action.

In addition, the messaging client is capable of processing messages that include user-defined data types. The rules used by a message client can refer to any user-defined type. As such, rules evaluation can be applied to any user-defined types. The messaging client allows users and applications to use rule-based messaging system 201.

Finally, an embodiment may use rules and redo tags to manage message flows in messaging systems that conform to various topologies. These include an hierarchical tree topology, a peer to peer topology, where each node talks to every other node in the distributed system (i.e. a clique), and a hub and spoke topology, where a primary database server communicates messages to secondary database servers who do not communicate messages with other secondary database servers. Oracle 9i, Streams describes several examples of hub and spoke topologies, including topologies referred to as "Section Primary Database Sharing Data with Several Secondary Databases", and "Section Primary Database Sharing Data with Several Extended Secondary Databases".

Hardware Overview

Figure 9:
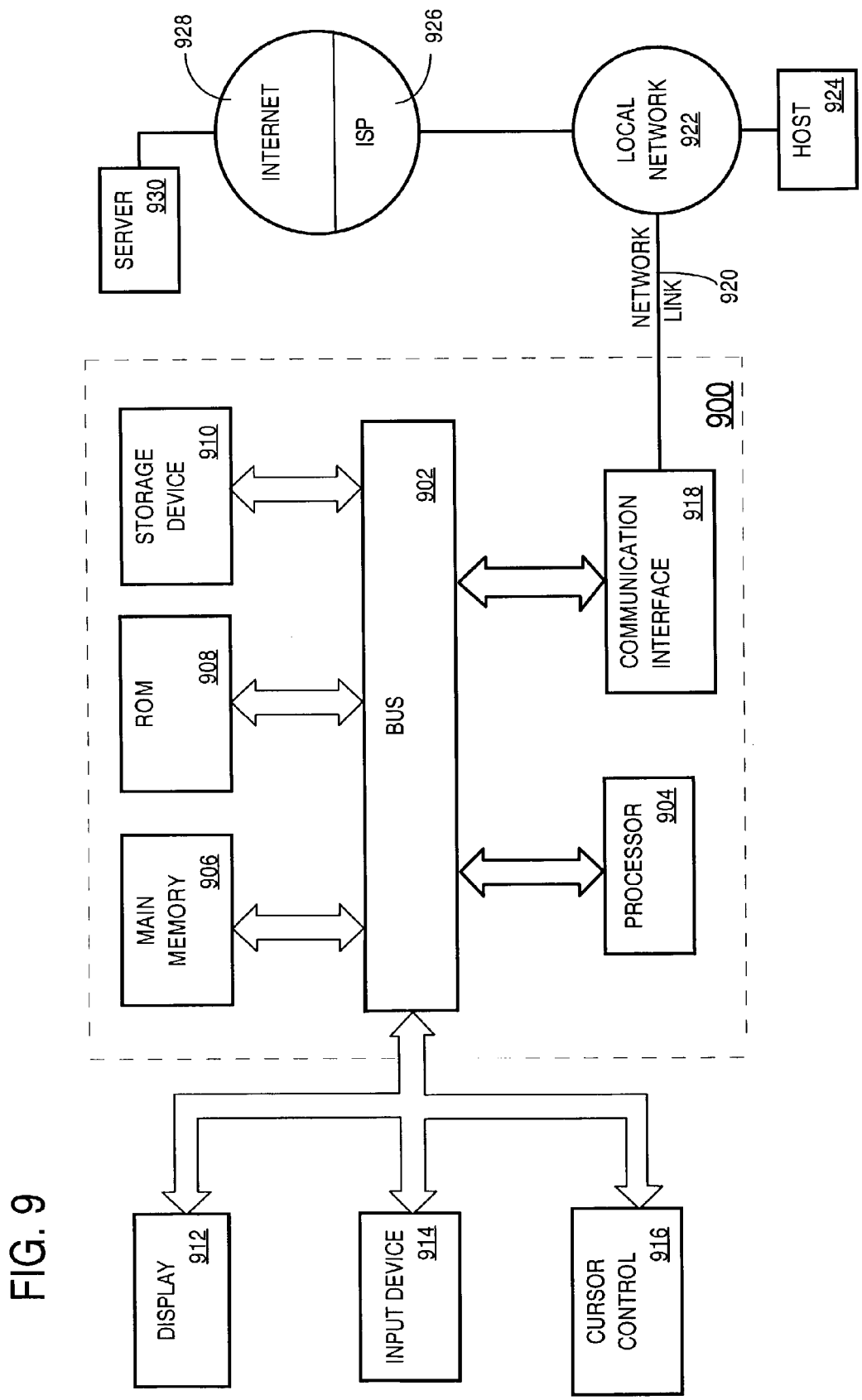
FIG. 9 is a computer system that may be used to implement an embodiment of the present invention.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modern local to computer system 900 can receive the data on the telephone line and use an infra-red transmitter to convert the data to an infra-red signal. An infrared detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for evaluating a set of rules, the method including the steps of:
    when at least one value of a plurality of values referenced by rules in said set of rules is available, but before a subset of said plurality of values is available, making a determination of whether said set of rules DOES or DOES NOT necessarily evaluate to a particular result;
    wherein each rule of said set of rules contains one or more rule conditions;
    wherein for each rule condition of each rule of said set of rules, the plurality of values includes each value referenced by said each rule condition;
    wherein each value of said plurality of values is referenced by a rule condition of a rule of said set of rules;
    when said determination of whether said set of rules DOES or DOES NOT necessarily evaluate to a particular result is that said set of rules DOES NOT necessarily evaluate to a particular result:
        generating one or more data structures that (1) hold said subset of said plurality of values and that (2) are needed to further evaluate said set of rules; and
        evaluating said set of rules based on said subset of said plurality of values;
    when said determination of whether said set of rules DOES or DOES NOT necessarily evaluate to a particular result is that said set of rules DOES necessarily evaluate to a particular result, then forgoing generating said one or more data structures; and
    wherein each step of said steps is executed by one or more computers.

2. The method of claim 1, further including for when said determination of whether or not said set of rules necessarily evaluate to a particular result is that said set of rules DOES NOT necessarily evaluate to a particular result, storing in a cache an evaluation result that denotes that said set of rules does not necessarily evaluate to a particular result based on said subset of said plurality of values, wherein said evaluation result is stored in said cache in a manner that associates said evaluation result with said subset of said plurality of values.

3. The method of claim 2, wherein the step of storing in a cache an evaluation result includes:
    generating a hash value based on the subset of said plurality of values; and
    storing the evaluation result in association with said hash value.

4. The method of claim 2, further including:
    for another evaluation of said set of rules, determining that the cache stores said evaluation result that denotes that said set of rules does not necessarily evaluate to a particular result; and
    in response to determining that the cache stores said evaluation result that denotes that said set of rules does not necessarily evaluate to a particular result, forgoing making a determination of whether said set of rules necessarily evaluate to a particular result.

5. The method of claim 1, wherein said plurality of values includes first one or more values reflecting a change to a column of a table stored at a database server.

6. The method of claim 5, wherein said subset of said plurality of values are read from a record of a redo log reflecting a change to a row in a table stored at a database server.

7. A computer-readable storage medium storing one or more sequences of instructions for evaluating a set of rules, said one or more instructions, which, when executed by one or more processors, causes the one or more processors to perform steps of:

when at least one value of a plurality of values referenced by rules in said set of rules is available, but before a subset of said plurality of values is available, making a determination of whether said set of rules DOES or DOES NOT necessarily evaluate to a particular result;

wherein each rule of said set of rules contains one or more rule conditions;

wherein for each rule condition of each rule of said set of rules, the plurality of values includes each value referenced by said each rule condition;

wherein each value of said plurality of values is referenced by a rule condition of a rule of said set of rules;

when said determination of whether said set of rules DOES or DOES NOT necessarily evaluate to a particular result is that said set of rules DOES NOT necessarily evaluate to a particular result:

generating one or more data structures that (1) hold said subset of said plurality of values and that (2) are needed to further evaluate said set of rules; and evaluating said set of rules based on said subset of said plurality of values; and when said determination of whether said set of rules DOES or DOES NOT necessarily evaluate to a particular result is that said set of rules DOES necessarily evaluate to a particular result, then forgoing generating said one or more data structures.

8. The computer-readable storage medium of claim 7, the steps further including for when said determination of whether or not said set of rules necessarily evaluate to a particular result is that said set of rules DOES NOT necessarily evaluate to a particular result, storing in a cache an evaluation result that denotes that said set of rules does not necessarily evaluate to a particular result based on said subset of said plurality of values, wherein said evaluation result is stored in said cache in a manner that associates said evaluation result with said subset of said plurality of values.

9. The computer-readable storage medium of claim 7, wherein the step of storing in a cache an evaluation result includes:

generating a hash value based on the subset of said plurality of values; and storing the evaluation result in association with said hash value.

10. The computer-readable storage medium of claim 7, the steps further including:

for another evaluation of said set of rules, determining that the cache stores said evaluation result that denotes that said set of rules does not necessarily evaluate to a particular result; and in response to determining that the cache stores said evaluation result that denotes that said set of rules does not necessarily evaluate to a particular result, forgoing making a determination of whether said set of rules necessarily evaluate to a particular result.

11. The computer-readable storage medium of claim 7, wherein said plurality of values includes first one or more values reflecting a change to a column of a table stored at a database server.

12. The computer-readable storage medium of claim 11, wherein said subset of said plurality of values are read from a record of a redo log reflecting a change to a row in a table stored at a database server.

13. The method of claim 1, wherein said subset of said plurality of values are read from a record of a redo log reflecting a change to a row in a table stored at a database server.

14. The computer-readable storage medium of claim 7, wherein said subset of said plurality of values are read from a record of a redo log reflecting a change to a row in a table stored at a database server.

\* \* \* \* \*

UNITED STATES PATENT AND TRADEMARK OFFICE
CERTIFICATE OF CORRECTION

PATENT NO. : 8,005,802 B2  
APPLICATION NO. : 10/452850  
DATED : August 23, 2011  
INVENTOR(S) : Lu et al.

It is certified that error appears in the above-identified patent and that said Letters Patent is hereby corrected as shown below:

On sheet 5 of 10, in figure 5, Box 1, line 2, delete "MESSSAGE" and insert -- MESSAGE --, therefor.

In column 7, line 10, delete "(:loc_id1:loc_id2)" and insert -- (:loc_id1, :loc_id2) --, therefor.

In column 7, line 45, delete "deparment" and insert -- department --, therefor.

In column 7, line 46, delete "deparment" and insert -- department --, therefor.

In column 7, line 47, delete "deparment" and insert -- department --, therefor.

In column 11, line 2, delete "equals i." and insert -- equals 1. --, therefor.

In column 11, line 63, delete "customer'" and insert -- 'customer' --, therefor.

In column 14, line 25, delete "'customer' }," and insert -- 'customer'}, --, therefor.

In column 17, line 9, delete "modern" and insert -- modem --, therefor.

Signed and Sealed this  
Fourteenth Day of February, 2012

David J. Kappos  
*Director of the United States Patent and Trademark Office*